(12) United States Patent
Korya et al.

(10) Patent No.: US 9,193,470 B2
(45) Date of Patent: Nov. 24, 2015

(54) AIRCRAFT FUEL TANK ACCESS COVER AND AN AIRCRAFT FUEL TANK

(75) Inventors: Chetan Korya, Bristol (GB); Timothy J. Sanderson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 506 days.

(21) Appl. No.: 13/401,966

(22) Filed: Feb. 22, 2012

(65) Prior Publication Data

US 2012/0217347 A1 Aug. 30, 2012

(30) Foreign Application Priority Data

Feb. 24, 2011 (GB) .................................. 1103190.3

(51) Int. Cl.
*B64D 37/00* (2006.01)
*B64C 1/14* (2006.01)
*B64C 3/34* (2006.01)

(52) U.S. Cl.
CPC ............ *B64D 37/005* (2013.01); *B64C 1/1446* (2013.01); *B64C 3/34* (2013.01)

(58) Field of Classification Search
CPC ....... B64D 37/005; B64C 3/34; B64C 1/1446
USPC ........ 244/135 R, 129.3–129.5; 220/328, 243, 220/327, 185.1, 3.4
See application file for complete search history.

(56) References Cited

U.S. PATENT DOCUMENTS

| | | | | |
|---|---|---|---|---|
| 2,832,494 A | * | 4/1958 | Baldwin | 220/3.4 |
| 4,291,816 A | * | 9/1981 | Lamoureux | 220/243 |
| 4,530,443 A | * | 7/1985 | Gorges | 220/327 |
| 4,867,334 A | * | 9/1989 | Robertson et al. | 220/243 |
| 4,964,659 A | * | 10/1990 | Baldwin | 292/19 |
| 5,291,845 A | * | 3/1994 | Vallery | 114/203 |
| 5,316,167 A | | 5/1994 | Kay | |
| 5,356,048 A | * | 10/1994 | Geiser | 222/185.1 |
| 5,669,190 A | * | 9/1997 | Szyjkowski | 52/196 |
| 6,505,441 B1 | * | 1/2003 | Shuey et al. | 49/463 |
| 8,287,173 B2 | * | 10/2012 | Khouri | 366/44 |
| 8,443,575 B1 | * | 5/2013 | Tanner et al. | 52/784.1 |
| 8,561,489 B2 | * | 10/2013 | Pettitt et al. | 73/866.5 |

FOREIGN PATENT DOCUMENTS

EP 0170300 A1 2/1986

OTHER PUBLICATIONS

Search Report of British Application No. 1103190.3 dated Jun. 15, 2011.

* cited by examiner

*Primary Examiner* — Valentina Xavier
(74) *Attorney, Agent, or Firm* — Hauptman Ham, LLP

(57) ABSTRACT

An aircraft fuel tank access cover comprises an inner door, an outer door and a clamping arrangement for clamping the doors together about an access aperture in the skin of the fuel tank. The clamping arrangement comprises a bolt in-molded in a generally central part of the inner door and or external nut. The doors have reinforcing rib arrangements to spread the clamping load to the peripheral edges thereof.

28 Claims, 6 Drawing Sheets

Figure 1:
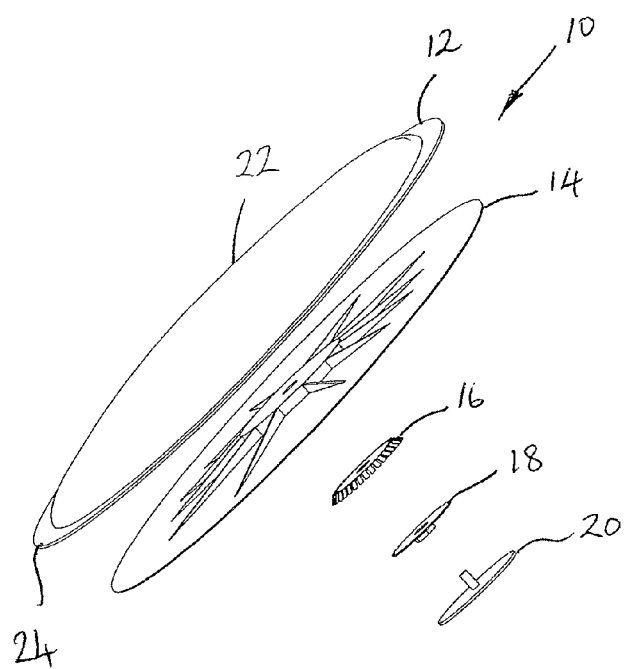

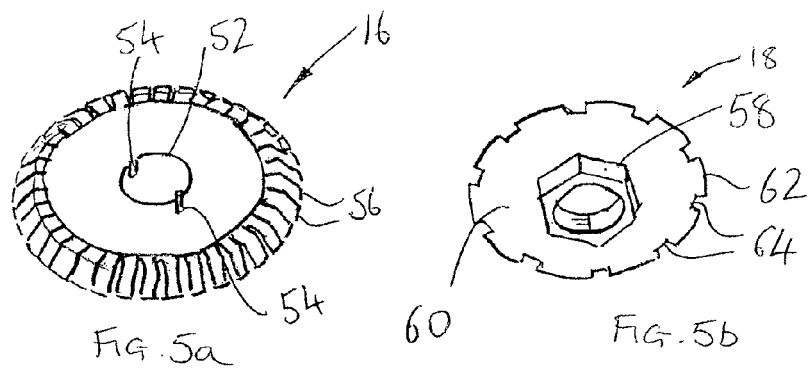
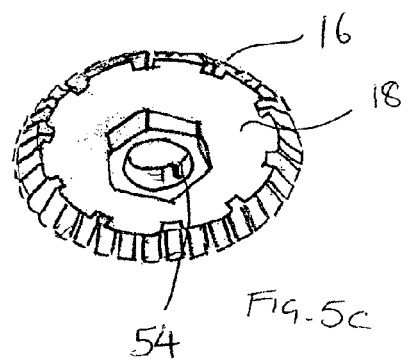
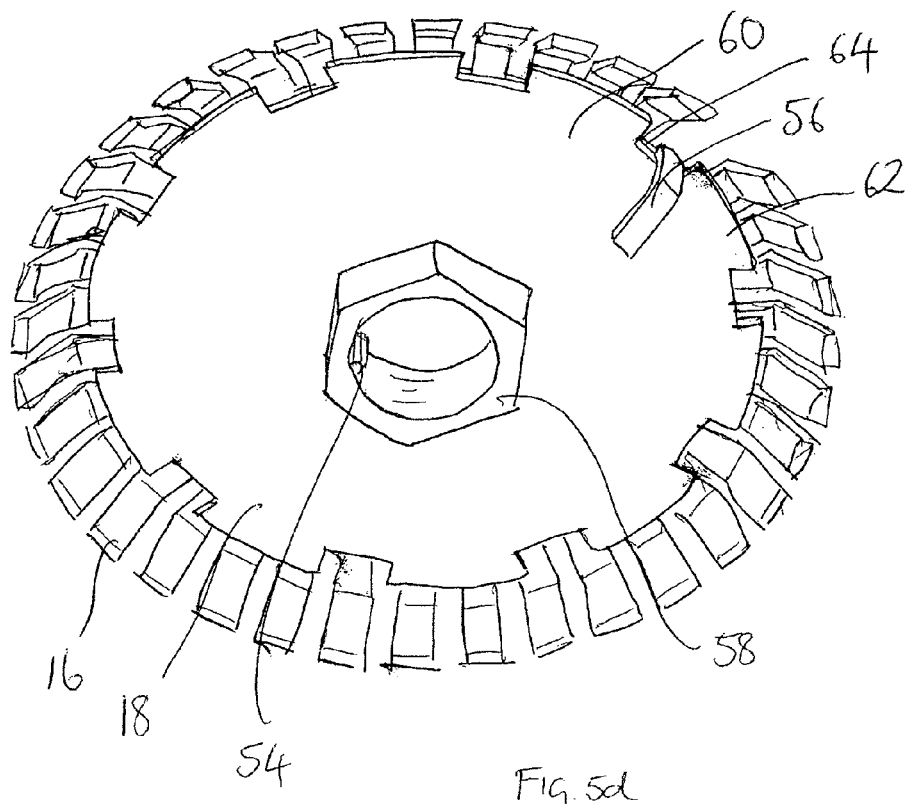

AIRCRAFT FUEL TANK ACCESS COVER AND AN AIRCRAFT FUEL TANK

RELATED APPLICATIONS

The present application is based on, and claims priority from, British Application Number 1103190.3, filed Feb. 24, 2011, the disclosure of which is hereby incorporated by reference herein in its entirety.

The invention relates to an aircraft fuel tank access cover and also to an aircraft fuel tank.

Aircraft fuel tanks are often arranged within the wings of aircraft. Access to those fuel tanks is required for a number of reasons ranging from fuel systems installation at manufacture to performing maintenance or repair tasks. To allow access, a number of manholes are often provided and they tend to be formed in the lower wing surface. Fuel tank access covers are used to cover the manholes and those covers need to provide a fuel seal and also disrupt as little as possible the aerodynamic flow over the lower wing surface.

On metal skinned wings two different access covers are used, namely load-bearing and non-load bearing access covers. Load-bearing access covers carry part of the wing loading across them and they are bolted to the wing skin to facilitate that load transfer. Non-load bearing access covers tend to be clamped either side of the skin. Both versions currently require a large number of bolts to be fastened in order to transfer the load in the case of load-bearing access covers and to provide sufficient clamping force around the edge of the access cover in either load-bearing or non-load bearing access covers. That large number of bolts requires a precise tightening sequence which is time-consuming on the final assembly line and during maintenance or repair operations.

It is an object of the invention to provide an improved fuel tank access cover.

According to a first aspect of the invention there is provided an aircraft fuel tank access cover comprising a first door part, a second door part and a clamping arrangement to allow the first and second door parts to be clamped together about an aperture in the skin of an aircraft, the clamping arrangement comprising a screw-threaded fastener which is arranged generally centrally of the door parts and extends from one door part through the other door part to secure the door parts together and at least one of the door parts having a reinforcing rib which spreads the clamping load exerted by the clamping arrangement from the centre of the door part outwardly to adjacent the edge of the door part.

In that way, an access cover is provided with a single nut and bolt to provide sufficient clamping force to maintain an appropriate fuel seal. That substantially reduces the time taken to either install the access cover or remove it. In some circumstances, more than one screw threaded fastener may be required but by arranging these generally centrally and relying on the rib arrangement to spread the load to the door edge, the total number of fasteners required is reduced.

The door part with the reinforcing rib preferably includes a plurality of ribs. The ribs are preferably arranged to extend radially from adjacent the location of the screw-threaded fastener to the edge of the door part. Preferably, both door parts have a reinforcing rib or ribs as described in this paragraph.

The screw-threaded fastener preferably comprises a bolt, either formed in one piece with one of the doors or in-moulded with one of the doors, and a nut. The fastener is most preferably a metallic bolt in-moulded in the door intended to be arranged inside the skin with an external nut. Alternatively, the screw-threaded fastener can comprise an integrally moulded or in-moulded nut with an external bolt.

A washer may be arranged between the external nut or bolt and the outer door. The washer and nut or bolt are preferably keyed with each other against rotation so as to prevent rotation of the washer relative to the nut or bolt.

Where the screw-threaded fastener comprises a bolt extending from the inner door and an external nut, the nut preferably includes a crenellated peripheral skirt and the washer has a tab or tabs on its peripheral edge which can lock the washer relative to the nut against relative rotation when the tab is bent into one of the crenellations.

The first door part is preferably the inner door part to be arranged inside the skin of the aircraft. The inner door part preferably includes an in-moulded insert to form the screw-threaded fastener, preferably an in-moulded metallic bolt. The first door part preferably comprises a domed body with a radially extending peripheral outer flange. The peripheral outer flange preferably includes a groove extending around the periphery and a seal may be arranged in the groove so that when the door part is secured to the other door part the seal is clamped against the skin of the aircraft.

The second door part, usually the outer door part, may include a central boss with an array of ribs extending radially from the boss.

The outer peripheral edge of the second door part is preferably stiffened relative to the rest of the door part. The central boss preferably includes a recess to receive part of the screw-threaded fastener, most preferably to receive the washer and external nut. Furthermore, a filler cap may be provided to cover the washer, nut and recess to preserve, as far as possible, the aerodynamic profile of the outer door when arranged on the skin of the aircraft.

According to a particular preferred embodiment of the invention, the first door part has an in-moulded bolt extending generally centrally therefrom, the second door part has an aperture therethrough, through which the bolt can extend and a washer and nut receive the bolt to clamp the first and second door parts together and a filler cap is arranged over the washer and nut to preserve the aerodynamic profile of the second door part.

According to a second aspect of the invention, there is provided an aircraft fuel tank comprising an outer skin with an aperture formed therein to allow access to the tank, the aperture being closed by an access cover comprising an inner door arranged inside the outer skin, an outer door arranged outside the outer skin and a clamping arrangement clamping the inner door to the outer door about the inner skin so as to close the aperture, the clamping arrangement comprising a single screw-threaded fastener arranged generally centrally of each door and at least one of the doors having a reinforcing rib arrangement which spreads the clamping load from the centre of the door to adjacent the edge thereof.

The inner door preferably includes an outer peripheral seal so that when the inner and outer doors are clamped together about the outer skin the seal on the inner door contacts the outer skin so as to effect a fuel-tight seal of the aperture.

The inner door is preferably domed and most preferably a plurality of ribs to spread the clamping load from the centre thereof to adjacent the edge thereof. The outer door preferably also includes a reinforcing rib arrangement.

The screw-threaded fastener preferably comprises a bolt extending from the inner door, through the outer door to be received in an external nut. A washer is preferably received between the nut and the outer door. The washer is preferably keyed relative to the bolt to lock the washer against rotation relative to the bolt. The washer preferably includes a formation to allow the washer to be locked relative to the nut after the nut is tightened into position. The formation preferably includes a tab on the washer to be received in an appropriate formation in the nut, for example, a crenellation in an outer skirt thereof.

The nut and washer are preferably received in a recess in the outer door which, in turn, may be covered by means of a cap so as to maintain the aerodynamic profile of the outer door.

Figure 2:
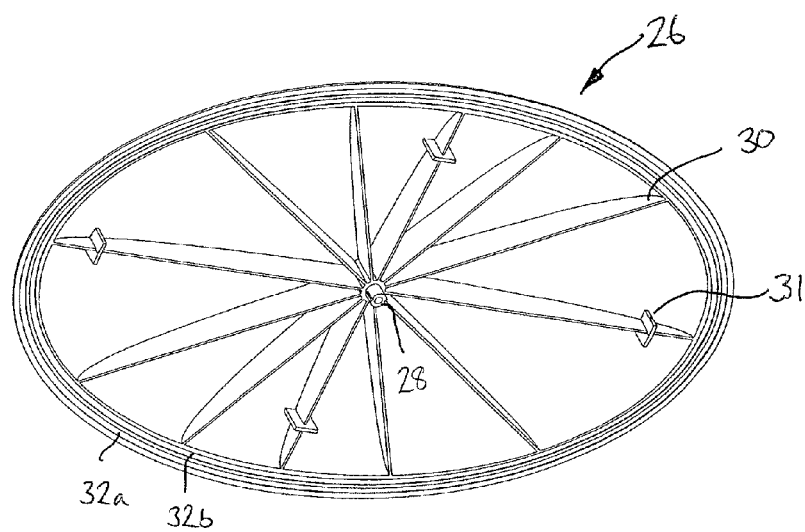
Figure 3:
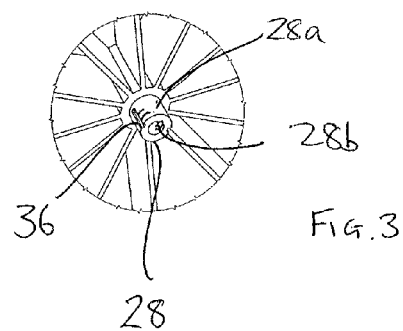
Figure 4A:
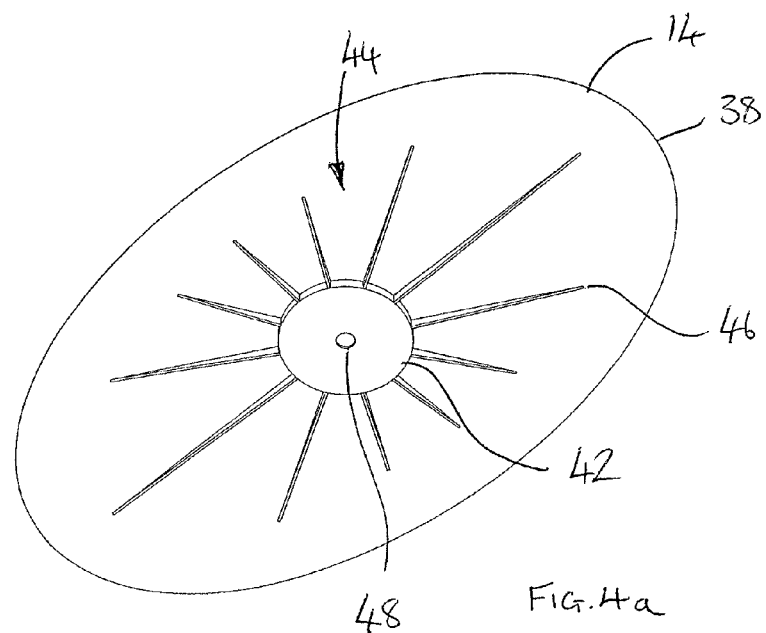
Figure 4B:
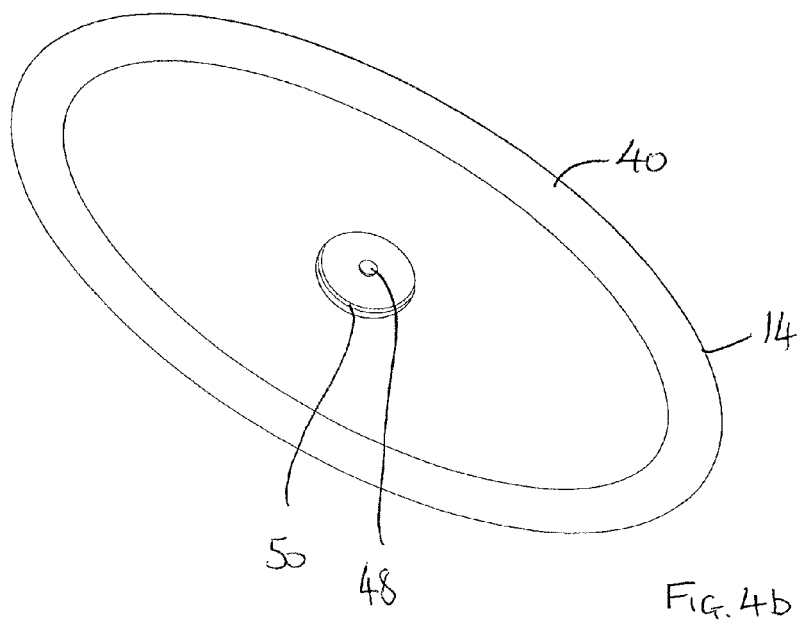
Figure 6:
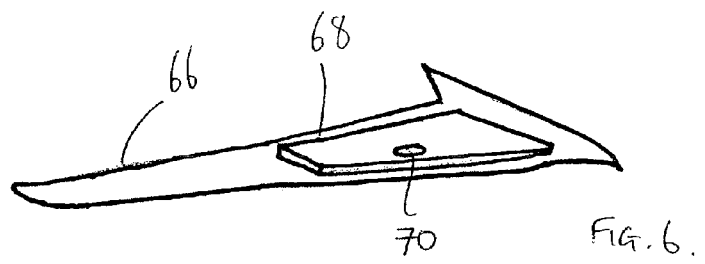
Figure 7:
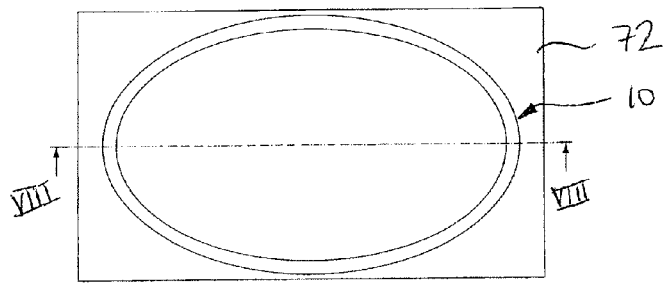
Figure 8:
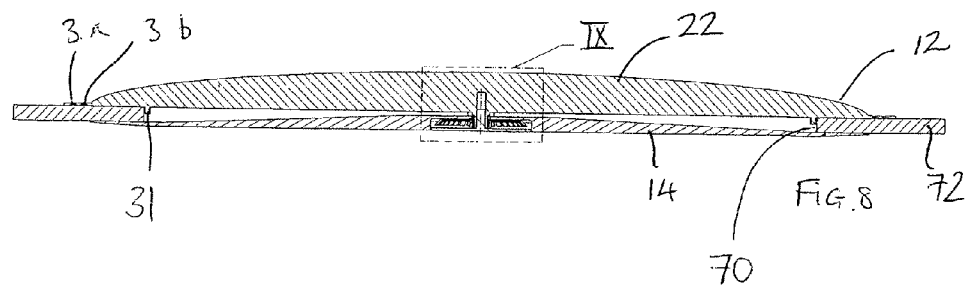
Figure 9:
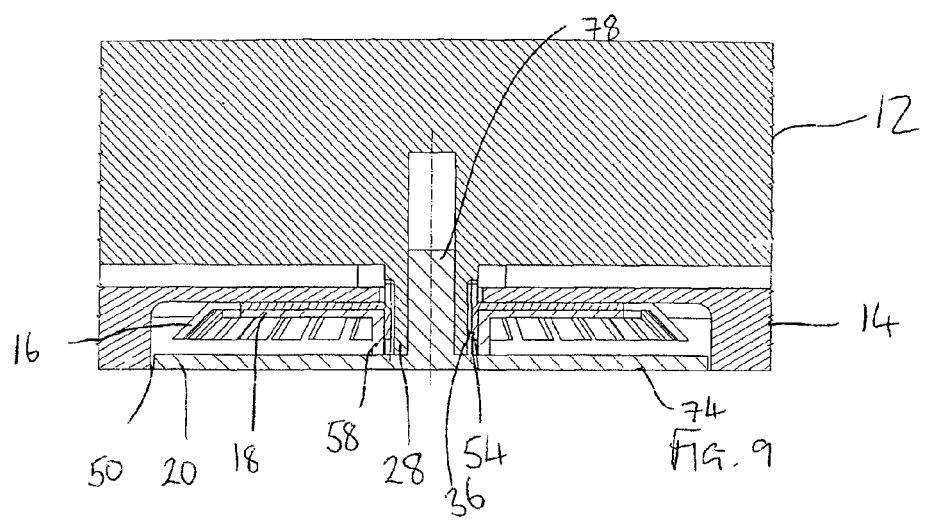

An embodiment of the invention will now be described by way of example and with reference to the accompanying drawings, in which:

FIG. 1 is an exploded perspective view of an aircraft fuel tank access cover according to the first aspect of the invention, FIG. 2 is a perspective view from the underside of the inner door of the aircraft fuel tank access cover of FIG. 1, FIG. 3 is a perspective view of part of the inner door of FIG. 2 shown to a larger scale, FIG. 4a is a perspective view of the upper face of the outer door, FIG. 4b is a perspective view of the lower face of the outer door of the access cover of FIG. 1, FIG. 5a is a perspective view of the lock washer of the access cover of FIG. 1, FIG. 5b is a perspective view of the lock nut of the access cover of FIG. 1, FIG. 5c is a perspective view of the lock washer and lock nut arranged together, FIG. 5d is a perspective view of the lock washer and lock nut locked together by folding of a tab on the lock washer, FIG. 6 is a schematic view of an aircraft wing fuel tank in accordance with the second aspect of the invention, FIG. 7 is a plan view from the inside of the fuel tank of FIG. 6 looking at a fuel tank access aperture closed by an access cover in accordance with the first aspect of the invention, FIG. 8 is a sectional view taken on line VIII-VIII in FIG. 7 of the access cover, and FIG. 9 is an enlarged sectional view of the part of FIG. 8 outlined in broken line box IX in FIG. 8.

An aircraft fuel tank access cover 10 comprises an inner door 12 and an outer door 14. The inner door is secured to the outer door by means of a screw-threaded fastening arrangement comprising a washer 16 and a nut 18 which screws onto an integral bolt extending from the inner door 12. A cap 20 covers the nut to maintain the aerodynamic profile of the outer door 14.

The inner door 12 comprises a domed central part 27 with an external peripheral flange 24 which extends radially outwardly from the peripheral edge of the domed part 22.

As shown in FIG. 2, the inner door 12 has a rib array 26. The rib array surrounds an in-moulded metallic bolt 28 and ribs 30 extend radially outwardly from the in-moulded metallic bolt 28 which is arranged generally centrally of the domed part 22. Twelve ribs are provided and are regularly angularly spaced at 30° degree angular spacings. The ribs at 12 o'clock, 3 o'clock, 6 o'clock and 9 o'clock positions in the array have locating tabs 31 extending therefrom. Two grooves, 32a, 32b are formed parallel to each other in the underside of the peripheral flange 24. The grooves 32a, 32b receive respective peripheral seals, 34a, 34b (see FIG. 8).

The in-moulded metallic bolt 28 has a hollow cylindrical form. The bolt 28 has a screw-threaded outer surface 28a and the inner surface of the hollow cylindrical bolt 28 also has a screw-thread 28b. A keyway 36 is formed in the outer surface of the bolt 28.

The outer door 14 comprises an elliptical body 38 with a reinforced peripheral edge 40. The upper side of the outer door 14 comprises a boss 42 which is generally centrally located relative to the elliptical body 38 and a rib array extending radially from the generally central boss 42. The rib array comprises twelve ribs 46 equally angularly spaced about the boss at 30° degree angular spacings. The length of the ribs 46 vary so that the end of each of the ribs terminates either at or just short of the reinforced peripheral edge 40. An aperture 48 is provided generally centrally of the boss 42 to allow passage of the in-moulded metallic bolt 28 in the inner door 12. Looking from the underside in FIG. 4, it can be seen that the boss 42 is formed by a recess 50 in the underside of the outer door 14.

A washer 16 (see FIG. 5a) is generally circular and has a washer aperture 52 formed generally centrally thereof. Two key way engaging tabs 54 are arranged diametrically opposed on opposite sides of the aperture 52. The washer 16 is surrounded by a comb-like series of tabs 56. The tabs 56 may be regularly angularly spaced about the washer 16 or may have irregular angular spacing.

The nut 18 comprises a main nut body 58 with an internal screw-thread arranged to engage the external screw-thread 28a on the in-moulded metallic bolt 28. A peripheral skirt 60 extends radially outwardly from the main nut body 58. The skirt has a series of peripheral teeth 62 formed by crenellating the peripheral edge of the skirt 60. The peripheral teeth 62 are separated by crenellation gaps 64.

As shown in FIG. 5, the nut 18, particularly the skirt 60, is dimensioned so as to fit snugly in the washer 16 surrounded by the cone-like tabs 56. The key way tabs 54 are received within the internally screw-threaded nut body 58. Once the nut 58 is fully tightened onto the bolt 28 (see FIG. 5d—bolt 28 omitted for clarity), the washer 16 can be secured to the nut 18 to prevent relative rotation between the washer 16 and nut 18 by bending one or more of the tabs 56 into one or more respective crenellation gap or gaps 64 in the skirt 60 of the nut 18.

FIG. 6 is a schematic view of an aircraft wing 66 which has a typical wing fuel tank 68 arranged inside the wing. The wing fuel tank includes an access aperture 70 formed in the skin 72 of the wing on the lower surface thereof.

When the access cover 10 in accordance with the invention is secured on the access aperture 70, the access aperture is closed and sealed against fuel egress and the outer door is arranged to maintain the aerodynamic profile of the wing skin on the underside of the wing 66.

As shown in FIG. 8, in order to close the access aperture 70, the inner door 12 is arranged inside the wing 66 so that the locating tabs 31 abut edges of the access aperture 70. The inner door 12 is arranged so that the seals 34a, 34b rest against the inside surface of the wing skin 72. In that configuration, the in-moulded bolt 28 in the inner door projects outwardly through the aperture 70. In order to secure the outer door to the inner door, the outer door is arranged in the access aperture 70 so that it spans the access aperture 70 and the metallic bolt 28 projects through the aperture 48 in a projecting boss 42 on the upper side of the outer door 14.

The washer 52 is then arranged over the projecting bolt 28 so that the key way tabs 54 slide along the key ways 36 formed in the outer surface of the bolt 28. The nut 18 is then screwed onto the bolt 28 which pulls the inner and outer door together compressively. When the nut is fully tightened on the bolt 28, the ribs 30 on the inner door 12 spread that compressive axial clamping load to the peripheral flange 24 which has the effect of pressing the seals 34a, 34b against the inner surface of the wing skin 72 so as to effect a fuel-tight seal around the edge of the inner door 12.

The array of ribs 44 in the outer door spreads the load from the centre of the outer door towards the reinforced peripheral edge 40. The outer door 14 is formed so as to disrupt as little as possible the aerodynamic profile of the undersurface of the wing 66. Once the nut 18 is fully fastened onto the bolt 28, one or more of the tabs 56 on the periphery of the washer 16 is bent into an available crenellation gap 64 in the skirt 60 of the nut 58 to prevent relative rotation of the nut and washer relative to each other. The washer and bolt are prevented from rotating relative to each other by means of the key-way 56 and the key way in the bolt 36. Finally, a filler cap 20 which has a flat circular body 74 and a projecting screw-threaded spigot 76 is screwed into the internal screw-threaded bore 28b in the metallic bolt 28. The circular body is dimensioned with a slight clearance between its peripheral edge and the inner edge of the recess 50 in the outer door 14 so that the filler cap closes the recess 40 and preserves the aerodynamic profile of the wing surface.

The provision of the generally centrally arranged screw-threaded fastener with the rib array to spread the axial clamping load to the peripheral edge of the doors reduces the requirement for numerous screw-threaded fasteners and the consequential complex manufacturing assembly and maintenance disassembly of the access covers.

Although in the embodiment shown a single screw-threaded fastener arrangement is shown, it is possible that more than one screw-threaded fastener may be provided generally centrally of the door with a rib arrangement in one or both of the doors spreading the clamping load to the peripheral edges of the doors.

The invention claimed is:

1. An aircraft fuel tank access cover comprising a first door part, a second door part and a clamping arrangement to allow the first and second door parts to be clamped together about an aperture in the skin of an aircraft, the periphery of the first door part and the periphery of the second door part each being configured substantially to overlap the skin of the aircraft so as to close the aperture, the clamping arrangement comprising a screw-threaded fastener which is arranged generally centrally of the door parts and extends from one door part through the other door part to secure the door parts together and at least one of the door parts having a reinforcing rib which spreads the clamping load exerted by the clamping arrangement from the centre of the door part outwardly to adjacent the edge of the door part.

2. An aircraft fuel tank access cover according to claim 1, in which the door part with the reinforcing rib includes a plurality of ribs.

3. An aircraft fuel tank access cover according to claim 2, in which the ribs are arranged to extend radially from adjacent the location of the screw-threaded fastener to the edge of the door part.

4. An aircraft fuel tank access cover according to claim 1 in which both door parts have a reinforcing rib or ribs.

5. An aircraft fuel tank access cover according to claim 1, in which the screw-threaded fastener comprises a bolt and a nut either formed in one piece with one of the doors or in-moulded with one of the doors.

6. An aircraft fuel tank access cover according to claim 5, in which the fastener is a metallic bolt in-moulded in the door intended to be arranged inside the skin with an external nut.

7. An aircraft fuel tank access cover according to claim 5, in which a washer is arranged between the external nut or bolt and the outer door.

8. An aircraft fuel tank access cover according to claim 7, in which the washer and nut or bolt are keyed with each other against rotation so as to prevent rotation of the washer relative to the nut or bolt.

9. An aircraft fuel tank access cover according to claim 6, in which the nut includes a crenellated peripheral skirt and the washer has a tab or tabs on its peripheral edge which can lock the washer relative to the nut against relative rotation when the tab is bent into one of the crenellations.

10. An aircraft fuel tank access cover according to claim 1, in which the first door part is the inner door part to be arranged inside the skin of the aircraft.

11. An aircraft fuel tank access cover according to claim 10, in which the inner door part includes an in-moulded insert to form the screw-threaded fastener, preferably an in-moulded metallic bolt.

12. An aircraft fuel tank access cover according to claim 10, in which the first door part comprises a domed body with a radially extending peripheral outer flange.

13. An aircraft fuel tank access cover according to claim 12, in which the peripheral outer flange includes a groove extending around the periphery and a seal arranged in the groove so that when the door part is secured to the other door part the seal is clamped against the skin of the aircraft.

14. An aircraft fuel tank access cover according to claim 10, in which the second door part, usually the outer door part, includes a central boss with an array of ribs extending radially from the boss.

15. An aircraft fuel tank access cover according to claim 14, in which the outer peripheral edge of the second door part is stiffened relative to the rest of the door part.

16. An aircraft fuel tank access cover according to claim 14, in which the central boss includes a recess to receive part of the screw-threaded fastener, most preferably to receive the washer and external nut.

17. An aircraft fuel tank access cover according to claim 16, in which a filler cap is provided to cover the washer, nut and recess to preserve, as far as possible, the aerodynamic profile of the outer door when arranged on the skin of the aircraft.

18. An aircraft fuel tank access cover according to claim 1, in which the first door part has an in-moulded bolt extending generally centrally therefrom, the second door part has an aperture therethrough, through which the bolt can extend and a washer and nut receive the bolt to clamp the first and second door parts together and a filler cap is arranged over the washer and nut to preserve the aerodynamic profile of the second door part.

19. An aircraft fuel tank comprising a skin with an aperture formed therein to allow access to the tank, the aperture being closed by an access cover comprising an inner door arranged inside the skin, an outer door arranged outside the skin and a clamping arrangement clamping the inner door to the outer door about the skin, wherein the periphery of the inner and the periphery of the outer doors each being configured substantially to overlap the skin of the aircraft so as to close the aperture, the clamping arrangement comprising a single screw-threaded fastener arranged generally centrally of each door and at least one of the doors having a reinforcing rib arrangement which spreads the clamping load from the centre of the door to adjacent the edge thereof.

20. An aircraft fuel tank according to claim 19, in which the inner door includes an outer peripheral seal so that when the inner and outer doors are clamped together about the skin the seal on the inner door contacts the skin so as to effect a fuel-tight seal of the aperture.

21. An aircraft fuel tank according to claim 19, in which the inner door is domed and most preferably a plurality of ribs to spread the clamping load from the centre thereof to adjacent the edge thereof.

22. An aircraft fuel tank according to claim 19 in which the outer door has the reinforcing rib arrangement.

23. An aircraft fuel tank according to claim 20, in which the screw-threaded fastener comprises a bolt extending from the inner door, through the outer door to be received in an external nut.

24. An aircraft fuel tank according to claim 23, in which a washer is received between the nut and the outer door.

25. An aircraft fuel tank according to claim 24, in which the washer is keyed relative to the bolt to lock the washer against rotation relative to the bolt.

26. An aircraft fuel tank according to claim 24, in which the washer includes a formation to allow the washer to be locked relative to the nut after the nut is tightened into position.

27. An aircraft fuel tank according to claim 26, in which the formation includes a tab on the washer to be received in an appropriate formation in the nut, for example, a crenellation in an outer skirt thereof.

28. An aircraft fuel tank according to claim 27, in which the nut and washer are received in a recess in the outer door which, in turn, is covered by means of a cap so as to maintain the aerodynamic profile of the outer door.

\* \* \* \* \*